United States Patent [19]

Hung

[11] Patent Number: 5,644,443
[45] Date of Patent: Jul. 1, 1997

[54] REFLECTIVE DEAD ANGLE VISION DEVICE FOR VEHICLE SIDE MIRRORS

[76] Inventor: Hsiang-Hsin Hung, 1-1, Fang Kuang Lane, Jen Ai Village, Fang Yuan Country, Changhua, Taiwan

[21] Appl. No.: 445,559

[22] Filed: May 23, 1995

[51] Int. Cl.⁶ .............................. G02B 5/08; G02B 5/10; G02B 7/182

[52] U.S. Cl. ................ 359/856; 359/858; 359/861; 359/865; 359/863; 362/83.1; 362/135

[58] Field of Search ...................... 359/856–858, 359/861–863, 865; 362/83.1, 135

[56] References Cited

U.S. PATENT DOCUMENTS

| | | | |
|---|---|---|---|
| 1,828,924 | 10/1931 | Charckell et al. | 359/857 |
| 2,697,379 | 12/1954 | Walker | 359/858 |
| 4,324,229 | 4/1982 | Risser | 126/439 |
| 4,685,779 | 8/1987 | Gonzalez | 359/862 |
| 5,237,459 | 8/1993 | Strauss | 359/863 |

Primary Examiner—Paul M. Dzierzynski
Assistant Examiner—Mohammad Y. Sikder
Attorney, Agent, or Firm—Beveridge, DeGrandi, Weilacher & Young

[57] ABSTRACT

The invention is a reflective dead angle vision device, which provides a line of sight for the driver that includes the area adjacent to the two front tires. The invention has a housing and two ultra wide-angle mirrors. The housing has movable transparent plates positioned at the front and rear, pivoting rectangular wide-angle mirrors positioned at the front and rear reflect light from a light bulb to provide forward illumination during day and night, an indicator light bulb positioned at a lower rear corner of the housing, intersecting water drainage troughs and a water drainage hole formed in the bottom, two hook-type mounting arms extend from the rear top edge to provide a means of installation onto a side mirror, and two flat rubber cushions are glued to the housing top for securing to the bottom of an automobile side mirror. The mirror positioned at the rear of the housing reflects the image of the zone adjacent to the outer periphery of the front two tires to the mirror positioned at the front to provide the driver with a line of sight that includes the dead angle projecting laterally past the two front tires to insure driving safety.

4 Claims, 5 Drawing Sheets

REFLECTIVE DEAD ANGLE VISION DEVICE FOR VEHICLE SIDE MIRRORS

BACKGROUND OF THE INVENTION

The invention is a reflective dead angle vision device for vehicle side mirrors that provides a line of sight for the driver that includes the zone adjacent to the outer periphery of the two front tires and thereby increases driving safety. The main components of the invention are a housing having two movable transparent plates, one in the front and the other in the rear; two pivoting rectangular wide-angle mirrors located so as to reflect through the transparent plates; a light bulb that reflects on the mirrors to provide forward illumination during both day and night; two hook-type mounting arms extend from the top of the rear side of the housing to provide a means of installation onto the upper surface of a side mirror; and two flat rubber cushions are glued to the top of the housing for securing it to the lower section of the side mirror. The mirror positioned in the rear corner within the housing reflects the image of the zone adjacent to the outer periphery of the front two tires to the mirror positioned in the front corner to provide the driver of the automobile with a line of sight that includes the dead angle projecting laterally past the two front tires, thereby insuring driving safety.

Although the driving ability of most people has continuously improved, public traffic equipment has failed to meet the requirements of a busy modern industrial society. The number of personal-use compact vehicles has multiplied. With so many people driving, the ability to see other motor vehicles has become the largest determinate of driving safety. There are numerous reasons for traffic accidents that occur while driving, for example many accidents occur when a driver attempts to overtake another vehicle or executes a turn that involves the area around the two front tires. One of the factors in these accidents is that the driver's seat is located on the left side, which leads to the presence of many dead angles in the line of vision to the right side. As frequently observed in other countries when a vehicle is driving in the right heavy vehicle lane of a road and encroaches into the motorcycle lane, transforming it into a lane with both heavy vehicles and motorcycles. Such a situation requires the driver to avoid motorcycles based on experience, however, a single misjudgment often results in a collision that causes serious injuries. Even in a situation where the execution of a turn is apparently successful, accidental impact to the side of the right tire may occur resulting in damage to the automobile necessitating costly repairs with the cause usually related to dead angles. The dead angles at the front of a vehicle pose a major vision problem for drivers and are a major factor in motor vehicle safety, especially as it relates to attempting to overtake another vehicle, which increases the probability of a traffic accident that will injure. Therefore, the visual impairment due to dead angles is a problem that can not be neglected.

Therefore, in view of the aforementioned adverse shortcomings attributed to the dead angle limiting the line of visual perception along the sides of the two front tires of a conventional automobile and in consideration of numerous years of continuous design experience, specifically in a field involving the improved design of reflective dead angle vision devices. This invention was developed following the trial application and testing of several prototypes. The invention herein is hereby submitted in formal application for a patent.

SUMMARY OF THE INVENTION

The primary objective of the invention is to provide a reflective dead angle vision device for vehicle side mirrors, which provides a line of sight for the vehicle driver that includes the area on the outside of the two front tires. The invention is mainly comprised of a housing and two ultra wide-angle mirrors. The housing has two movable transparent plates positioned at both the front and the rear, two pivoting rectangular wide-angle mirrors positioned in opposite corners to provide a line of sight to the driver and to reflect light from a light bulb to provide forward illumination during both the day and the night, an indicator light bulb positioned at a rear lower corner of the housing, intersecting water drainage troughs and a water drainage hole formed into the bottom surface, two hook-type mounting arms extend from the top of the rear side of the housing to allow installation onto the upper surface at the forward end of the vehicle side mirror, and two flat rubber cushions are glued onto the top of the housing for securing to the lower section of the vehicle side mirror. The mirror positioned in the rear corner within the housing reflects the image of the zone adjacent to the outer periphery of the front two tires to the mirror positioned in the front corner to provide the driver with a line of sight, that includes the zone of the dead angle, when attempting to overtake another vehicle or executing a turn. This invention effectively insures driving safety.

The first feature of the invention is a movable transparent plate positioned at both the front and the rear of the housing. The front transparent plate is utilized to provide an unobstructed line of sight for the rear mirror of the housing, while the rear movable transparent plate provides the driver with an unobstructed view of the dead angle projected laterally past the front tires from the front mirror. The adjustable ultra wide-angle mirrors provided inside the housing are adjustable to fit a particular vehicle model.

Another feature of the invention is a light bulb socket mounted on the rear movable transparent plate that projects towards the front mirror, because there is a curved plate that enables the mirrors to function as a point of forward illumination during both day and night. The light reflected from the front mirror and the curved plate is reflected for forward illumination by the rear mirror. Also, an indicator light bulb is positioned at a rear lower corner of the housing to effectively indicate the physical proximity of a vehicle.

Yet another feature is intersecting water drainage troughs and a water drainage hole formed in the bottom surface of the housing that provides for the drainage of accumulated water. The drainage hole, also, provides a ventilation outlet to effectively prevent the formation of mist condensation on the mirrors.

The improved structural innovations of the invention are further elaborated below through the brief description of the drawings and the detailed description of the invention. The aforesaid drawings and the respective descriptions are as follows.

DETAILED DESCRIPTION OF THE INVENTION

Figure 1:
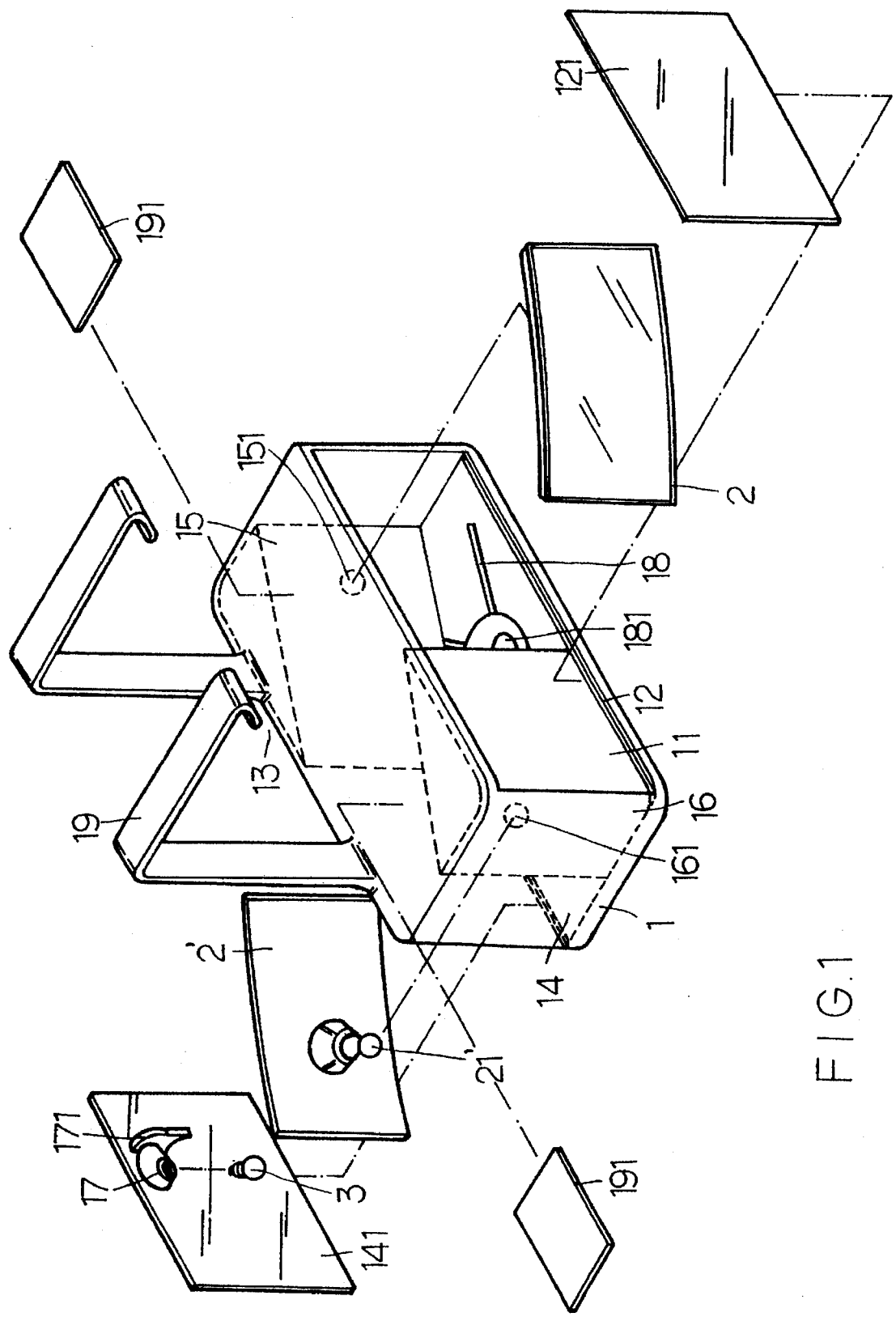
FIG. 1 is an exploded perspective view of the structure of the invention.

As shown in FIGS. 1–5, the invention is a reflective dead angle vision device for vehicle side mirrors. FIGS. 1–4 show the invention as configured for the passenger side mirror, however, the following description will be equally applicable to both side mirrors of a vehicle. The main components are a housing (1), two ultra wide-angle mirrors (2) and (2'), and two light bulbs (3).

The housing (1) generally is a rectangular solid having an open front and rear sides. There is a front cover plate (11) over the half of the housing (1) farthest from the vehicle, a front sliding track (12) along the front lower edge and a front movable transparent plate (121) is inserted onto the sliding track (12). On the rear side of the housing (1) there is a rear cover plate (13) over the half closest to the vehicle, a rear sliding track (14) along the lower edge, and a rear movable transparent plate (141) is inserted onto the sliding track (14). Furthermore, there is a first block (16) positioned at the front of the housing (1) with a ball socket (161) and a second block (15) positioned at the rear of the housing (1) with a ball socket (151). Both blocks abut their respective cover plates. Additionally, positioned on the rear transparent plate (141) is a plate light bulb socket (17) that projects light towards the front mirror (2'), because at the vehicle side of the plate light bulb socket (17) is a curved plate (171). A corner light bulb socket (17A) is positioned at the lower rear corner of the housing (1) closest to the vehicle. There are intersecting water drainage troughs (18) and a water drainage hole (181) formed into the bottom surface of the housing (1). Finally, extending from the top rear edge surface of the housing (1) are two hook-type mounting arms (19) and glued to the top of the housing (1) are two flat rubber cushions (191).

The two ultra wide-angle mirrors (2 and 2') each have a ball mount (21 and 21' protruding from the rear side) that is inserted into the ball socket (151 and 161) of a respective block (15 and 16) so as to enable the two ultra wide-angle mirrors (2 and 2') to be configured approximately in parallel. Also, the half sections can be adjusted into opposition through upward, downward, leftward and rightward pivoting referring to the FIG. 2.

Figure 3:
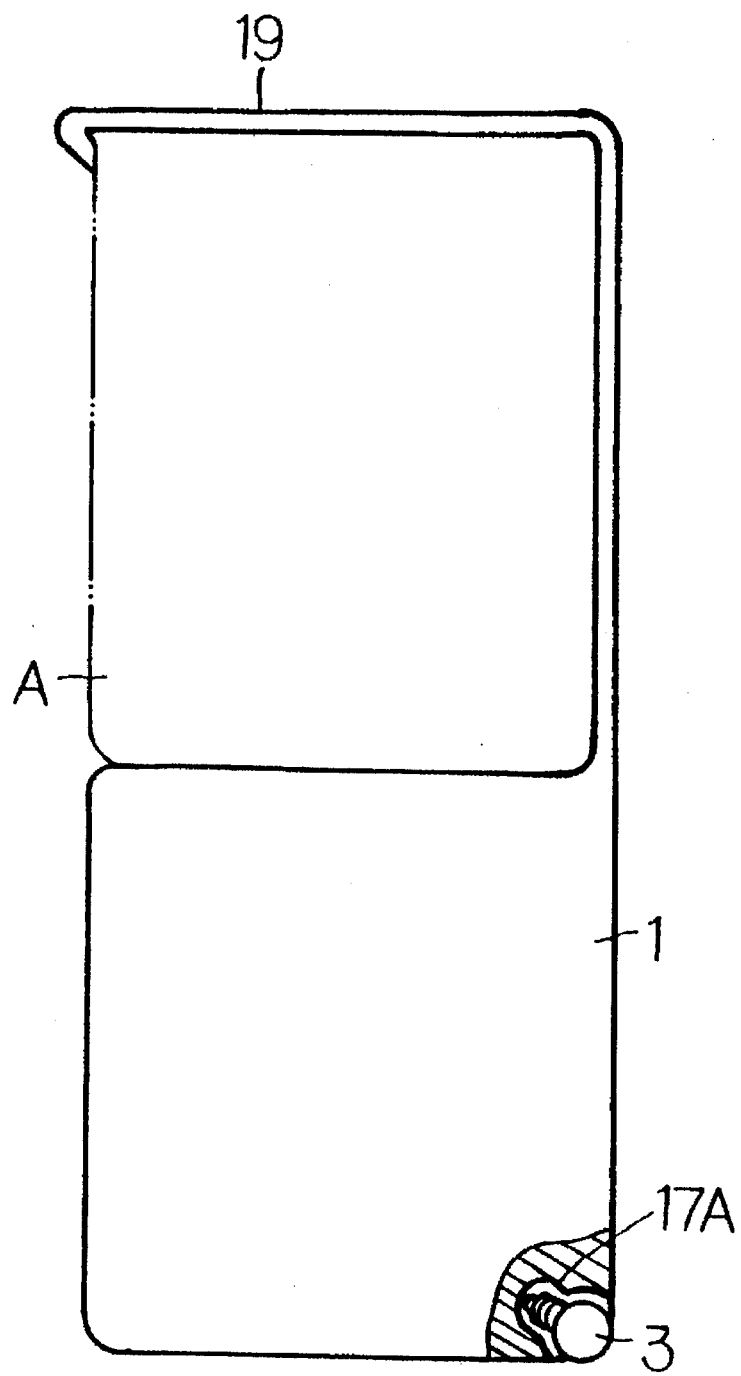
FIG. 3 is a plan view of the structure of the invention as attached to a side mirror of a vehicle.
Figure 4:
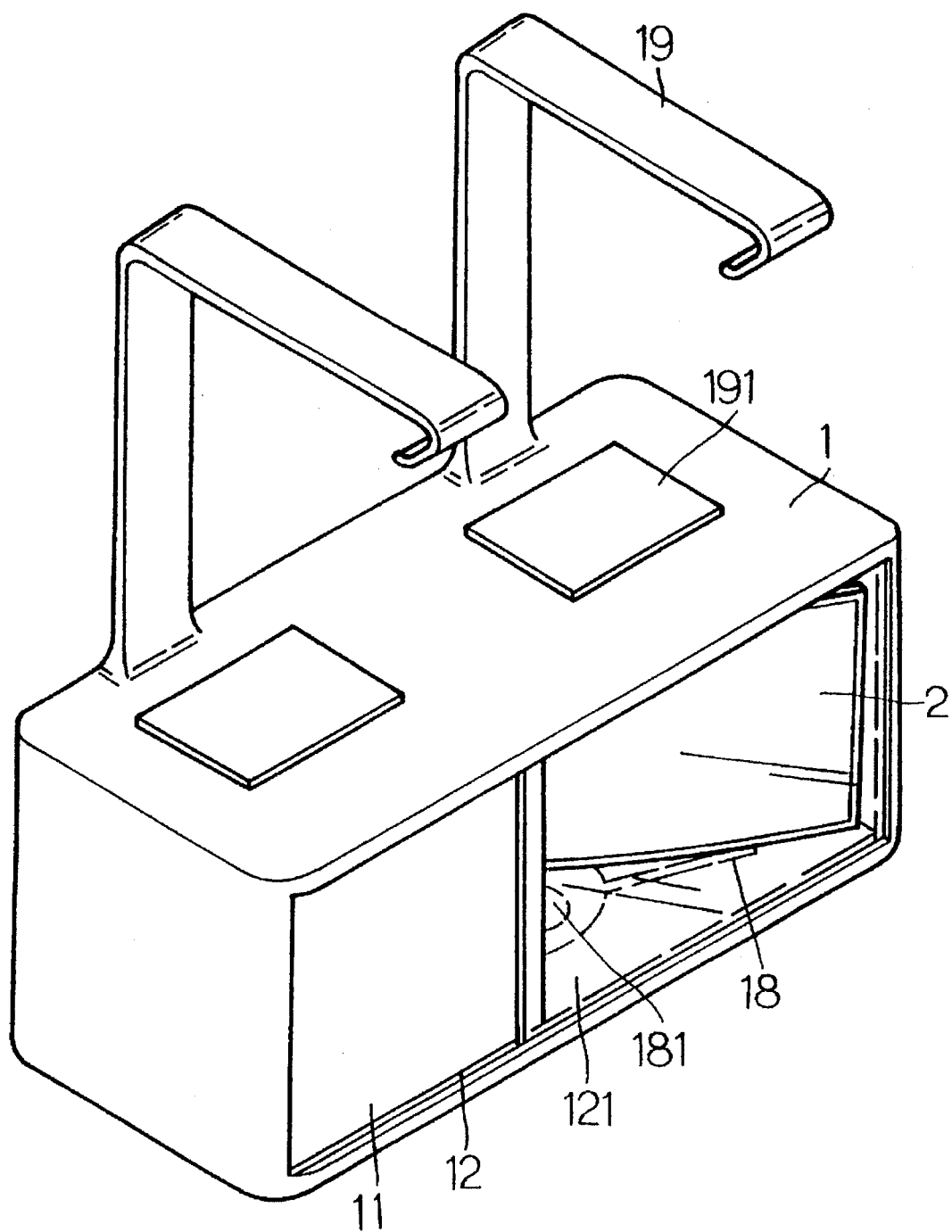
FIG. 4 is perspective view of the structure of the invention as assembled.

The light bulbs (3) of the invention are installed into the plate light bulb socket (17) positioned on the rear transparent plate (141) and the corner light bulb socket (17A) positioned at the lower rear corner of the housing (1) closest to the vehicle referring to FIG. 3.

The hook-type mounting arms (19) extending from the rear side of the housing (1) are installed onto the upper surface and forward edge of a vehicle side mirror (A) and the two flat rubber cushions (191) glued to the top side of the housing (1) are secured through an adhesive to the bottom of the vehicle side mirror.

Figure 2:
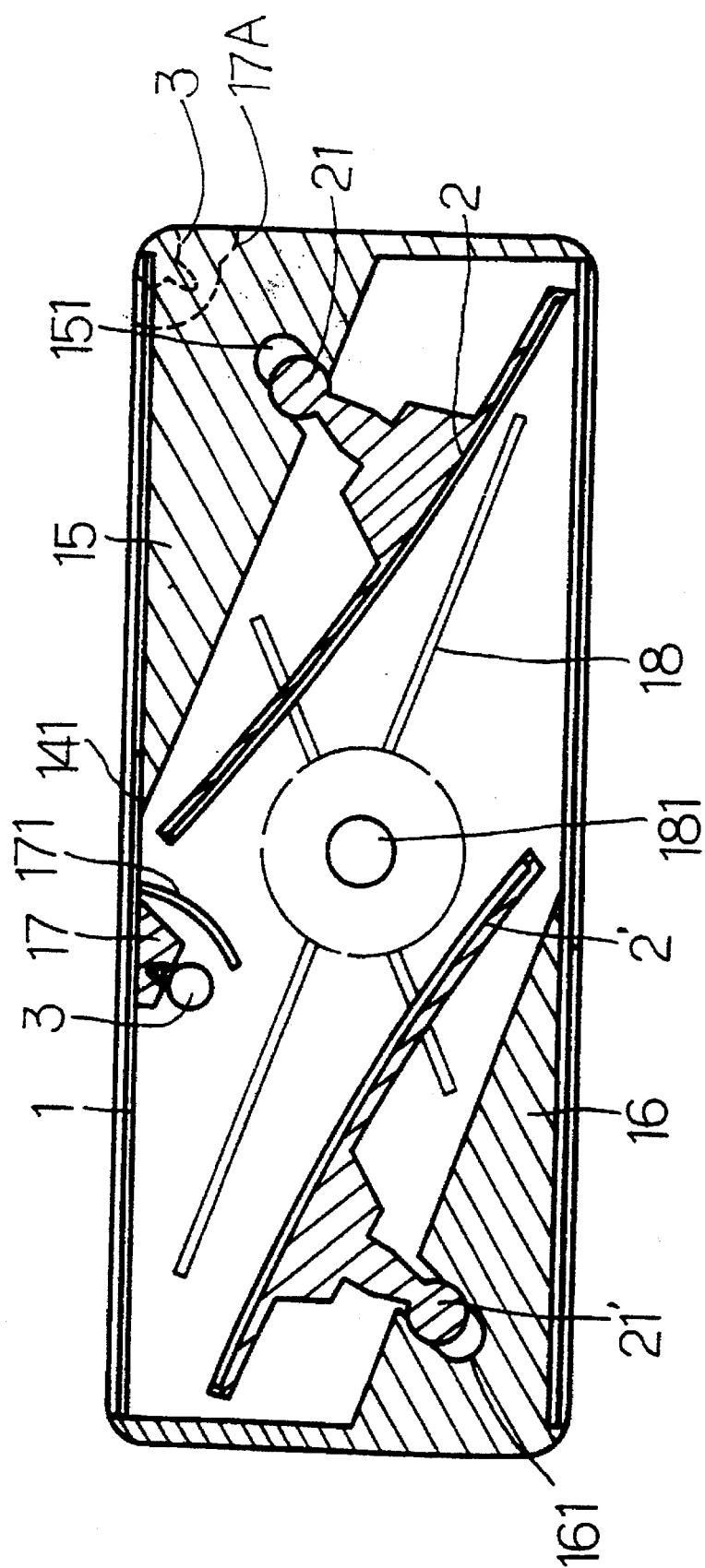
FIG. 2 is a cross-sectional auxiliary view of the structure of the invention.
Figure 5:
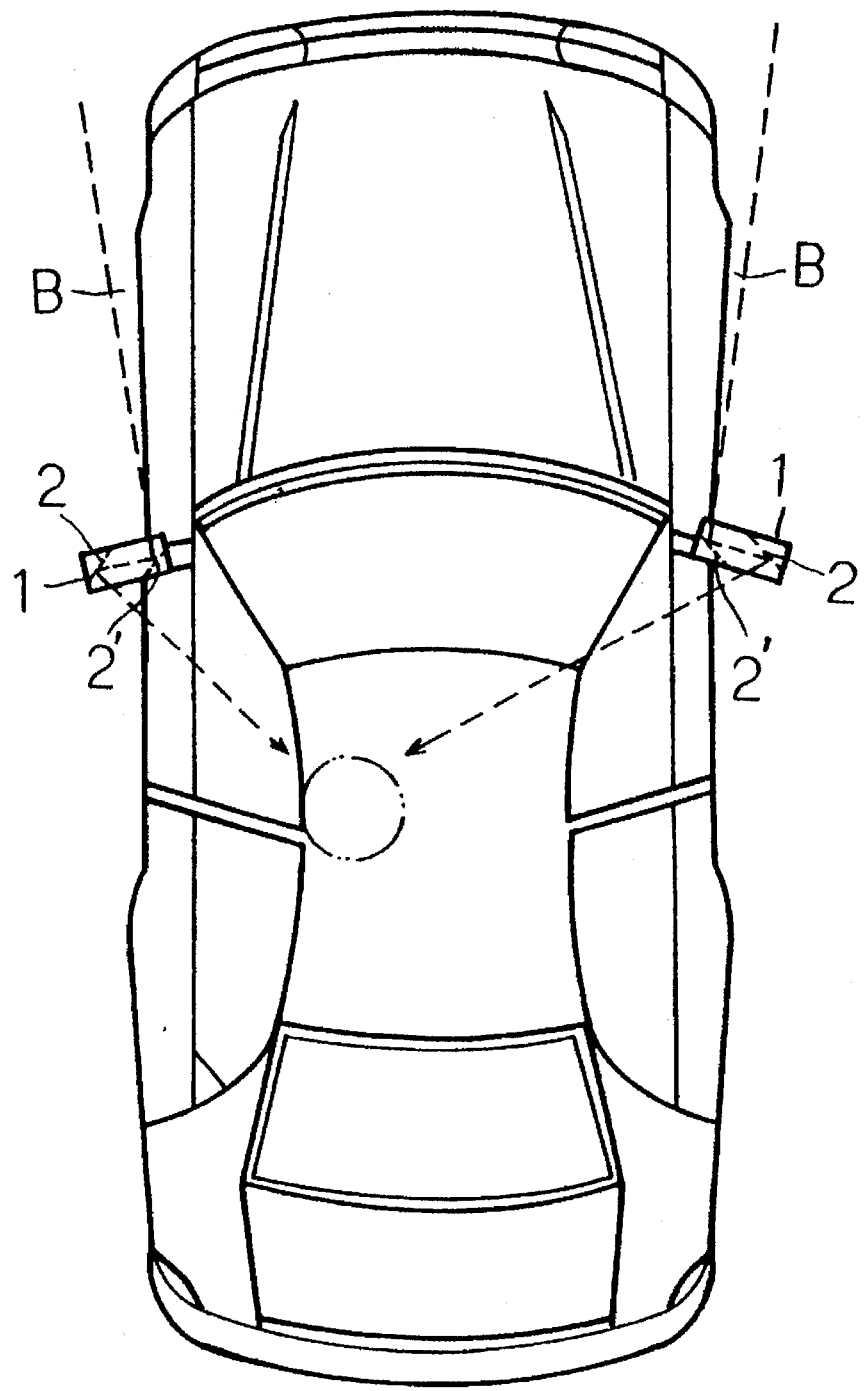
FIG. 5 is a plan view of the structure of the invention as installed on an automobile.

As shown in FIG. 2, FIG. 3, and FIG. 5, the right ultra wide-angle mirror (2') positioned at the rear of the housing (1) reflects the line of view extending laterally towards the dead angle lateral to the front tire (B) to the front ultra wide-angle mirror (2). Therefore, when the vehicle is being driven, the driver can see the lateral dead angle by the front tire (B) as projected by the invention such that when attempting to overtake a vehicle the dead angle view of the driver can be improved though adjustment of the mirrors to insure effective driving safety.

In summation of the foregoing description, the structural embodiment of the invention is guaranteed to be innovative and effective. The invention complies with new invention application requirements and is hereby submitted to the U.S. Patent and Trademark Office in application for and granting of the commensurate patent rights in accordance with the relevant laws.

What is claimed is:

1. A reflective dead angle vision device for a vehicle side mirror comprising:

a housing, said housing having a rectangular box for an internal structure, and said housing having open front and rear sides;

a water drainage hole in communication with a bottom surface of said housing and extending through said surface;

a plurality of drainage troughs extending from said water drainage hole along said bottom surface of said housing;

a front sliding track along a bottom longitudinal edge of said housing;

a rear sliding track along a bottom longitudinal edge of said housing opposite said front sliding track;

a front cover plate attached to a side, bottom, and top of said housing, and extending along a parallel path to said front sliding track to a predetermined point;

a rear cover plate attached to a side, bottom, and top of said housing, and extending along a parallel path to said rear sliding track in a length equivalent to a length of said front cover plate;

a first block abutting said front cover plate, and extending from an open edge of said front cover plate to a second predetermined point along the side of said housing attached to said front cover plate;

a second block abutting said rear cover plate, and extending from an open edge of said rear cover plate to the second predetermined point along the side of said housing attached to said rear cover plate;

said first and second inclined blocks having a ball socket extending into a side facing said water drainage hole;

said first and second inclined blocks having surfaces extending along parallel lines;

a pair of ultra wide-angle mirrors each having a ball mount;

said ball mounts are in communication with said corresponding ball sockets, respectively;

a transparent plate in communication with said rear sliding track, covering an opening formed between the edge of said rear cover plate and the side of said housing;

said transparent plate having a plate light bulb socket mounted on a surface facing said front sliding track;

a curved plate affixed to said movable transparent cover plate on a side of said light bulb socket closest to said rear cover plate;

a transparent plate in communication with said front sliding track and having sufficient size to cover an opening formed between said front cover plate and the side of said housing;

a corner light bulb socket mounted in a lower rear corner of said housing below said second block;

a pair of flat rubber cushions affixed to top of said housing; and a pair of hook-type mounting arms extending from the top rear edge of said housing for securing said housing to a vehicle said mirror.

2. A reflective dead angle vision device for vehicle side mirrors as defined in claim 1, wherein said pair of hook-type mounting arms comprise a vertical portion and a horizontal hook portion extending from said vertical portion.

3. A reflective dead angle vision device for vehicle side mirrors as defined in claim 1, wherein said pair of hook-type mounting arms extend above said pair of flat rubber cushions.

4. A reflective dead angle vision device for vehicle side mirrors comprising:

- a housing having open front and rear sides and a bottom surface,
- a sliding track on said bottom surface along each of said front and rear sides,
- a front cover plate within said housing and covering a portion of said front side of said housing,
- a rear cover plate within said housing and covering a portion of said rear side of said housing,
- a first block within said housing adjacent said front cover plate,
- a second block within said housing adjacent said rear cover plate,
- a pair of mirrors mounted on said first and second blocks, respectively,
- a transparent plate slidably mounted on each of said sliding tracks; each of said plates being of a size to cover the remaining portion of said open front and rear sides of said housing which are not covered by said front and rear cover plates, whereby, said transparent plates are slidable on said slidable tracks to provide ready access to the interior of said housing to adjust said mirrors,

- and fastening means for fastening said housing to a vehicle side mirror,
- said bottom surface of said housing has a water drainage hole therethrough,
- said bottom surface of said housing having drainage troughs therein communicating with said drainage hole whereby water present in the housing can drain out through said troughs and said drainage hole,
- said transparent plate slidably mounted on said sliding track on said rear side has a light socket affixed to said transparent plate,
- a curved plate affixed to said transparent plate on a side of said light socket, wherein, said curved plate reflects light from a light bulb in said socket to said mirror attached to said first block which reflects light to said mirror attached to said second block.

* * * * *